P. R. HIRSH 2,476,299

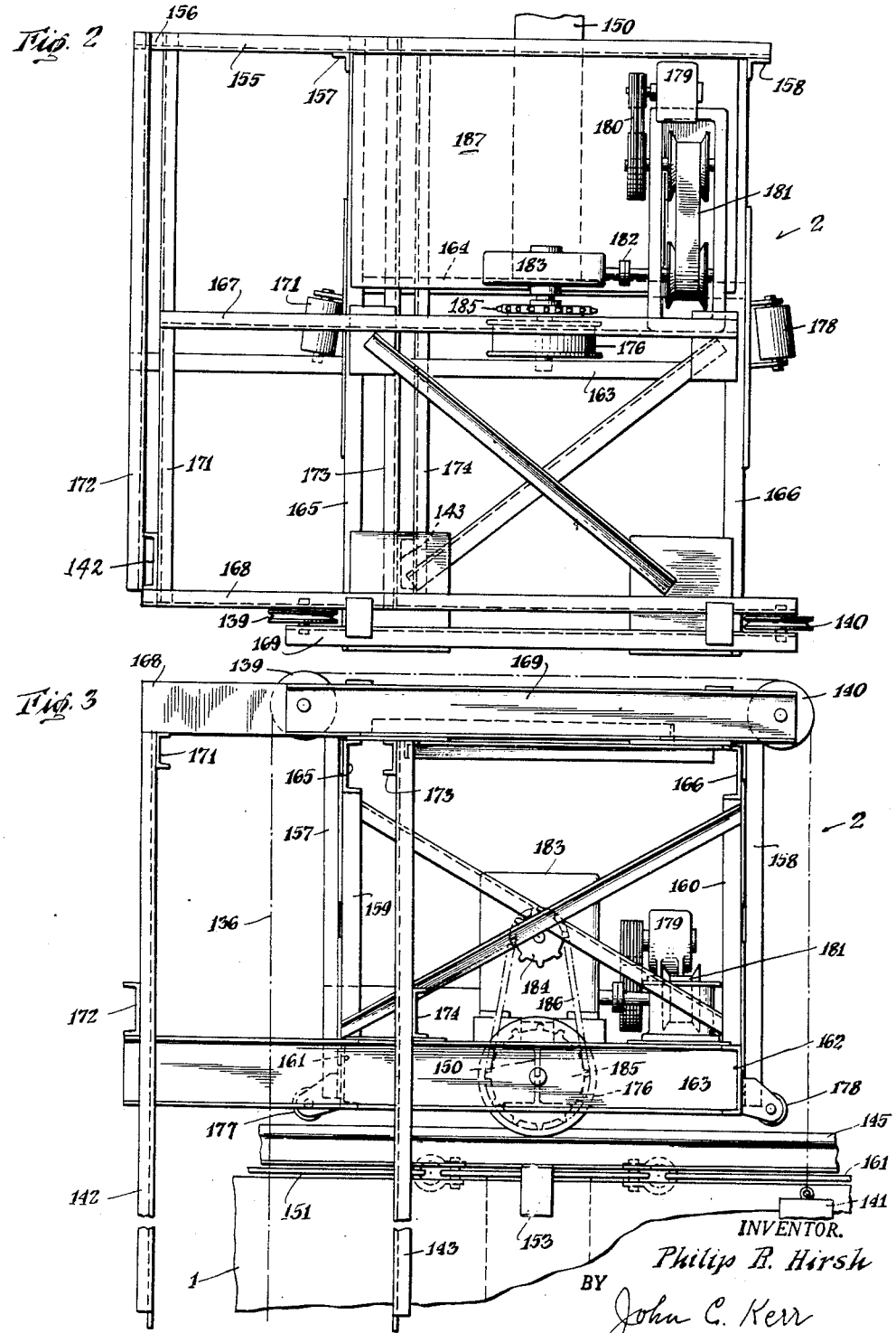
July 19, 1949.  P. R. HIRSH  2,476,299
MACHINE FOR APPLYING COATING TO LARGE
VERTICAL CYLINDRICAL OBJECTS
Filed Dec. 29, 1944  8 Sheets-Sheet 2
INVENTOR.
Philip R. Hirsh
BY John C. Kerr
ATTORNEY July 19, 1949.

MACHINE FOR APPLYING COATING TO LARGE
VERTICAL CYLINDRICAL OBJECTS

Filed Dec. 29, 1944

INVENTOR.
Philip R. Hirsh
BY
John C. Kerr
ATTORNEY

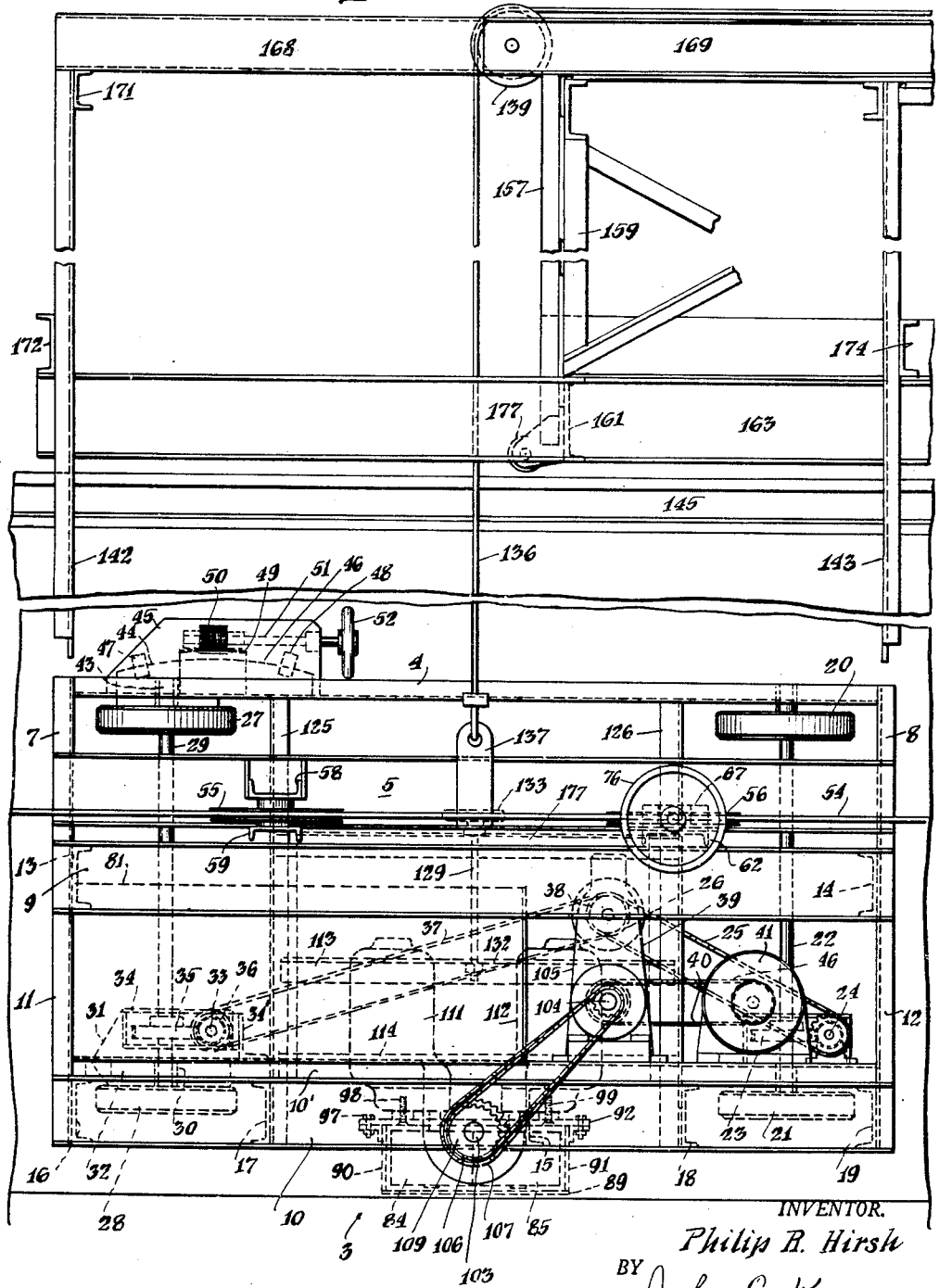

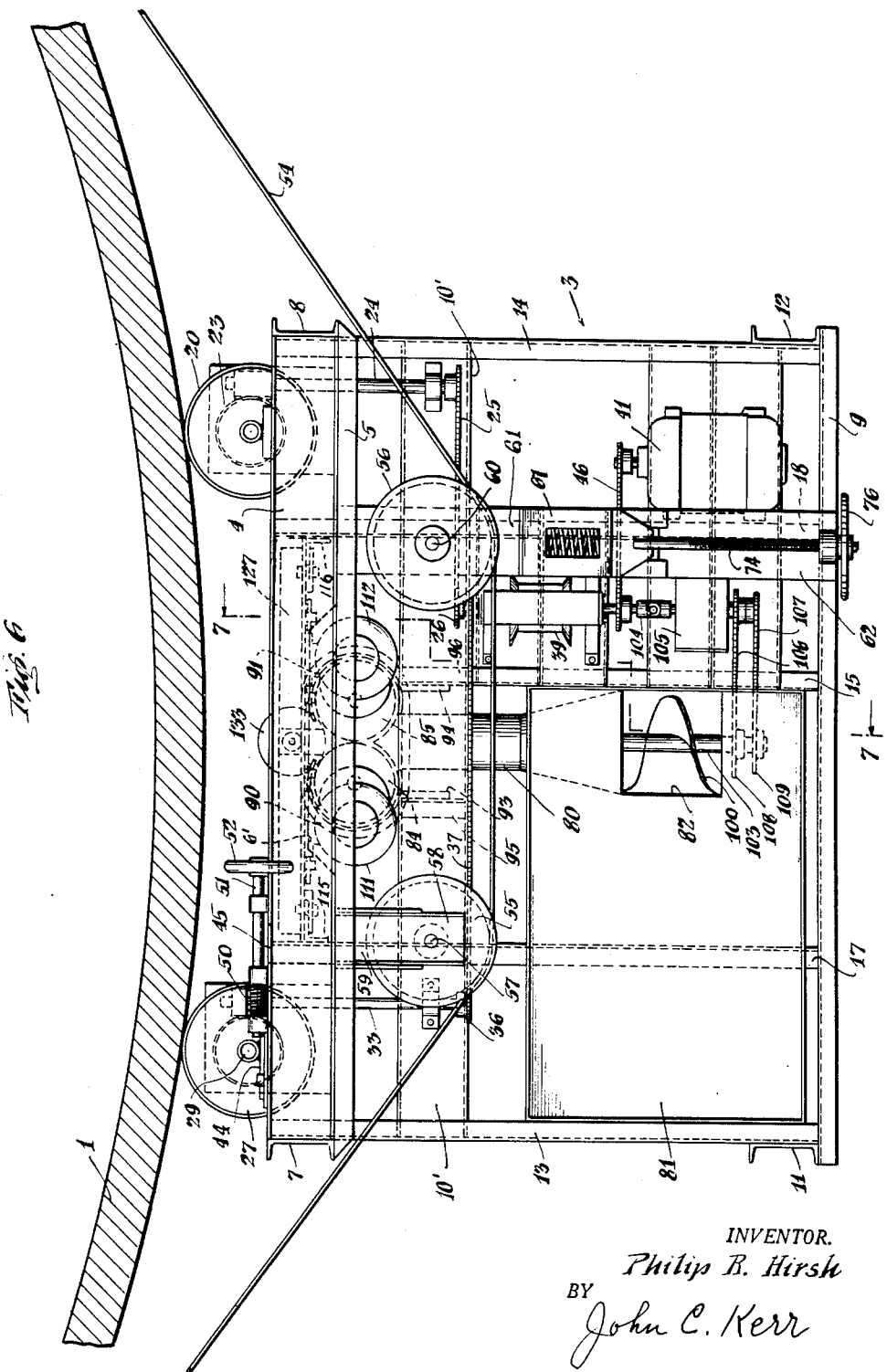

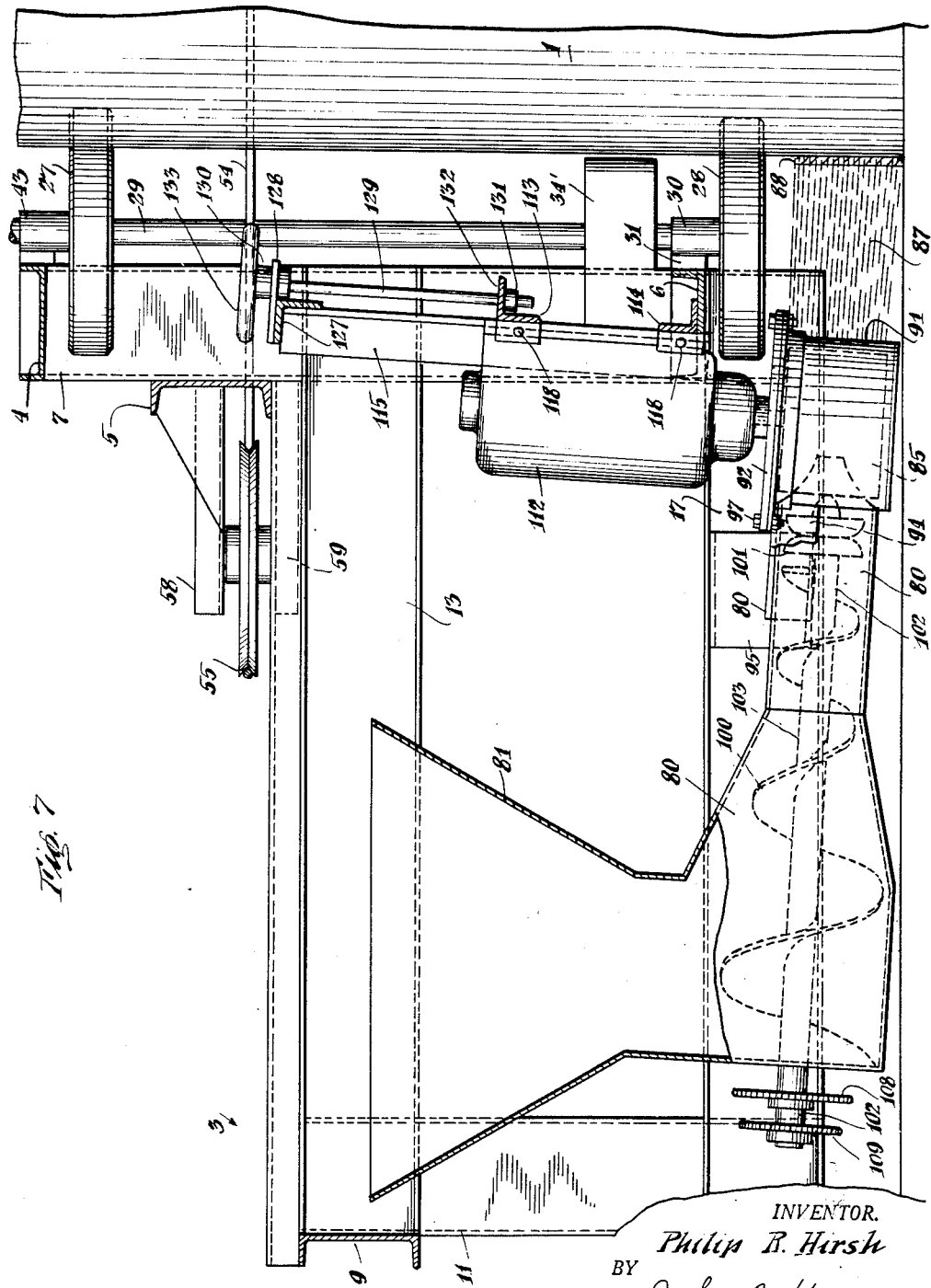

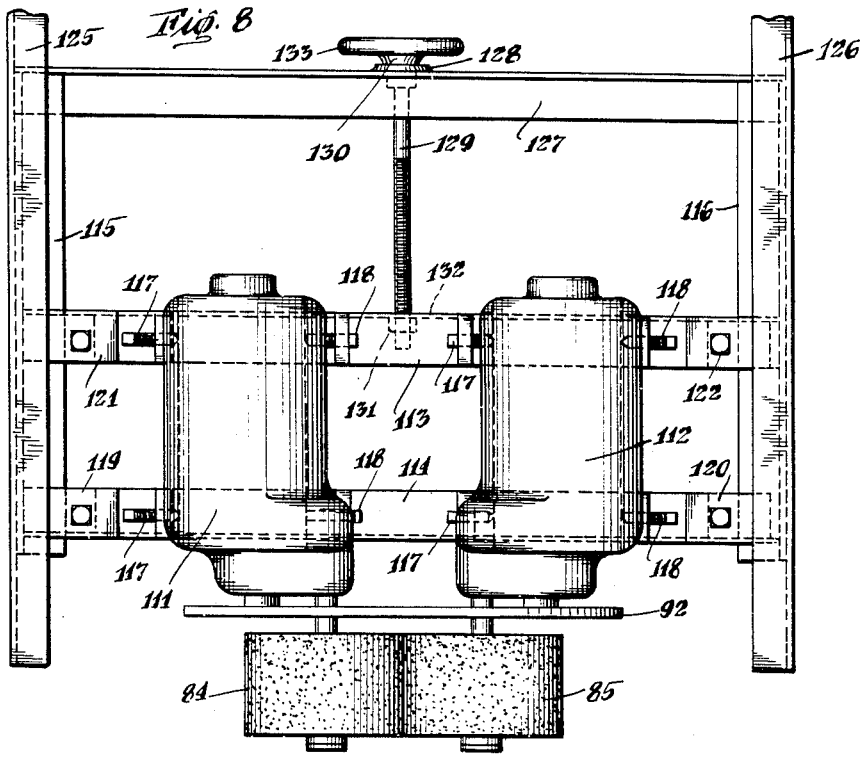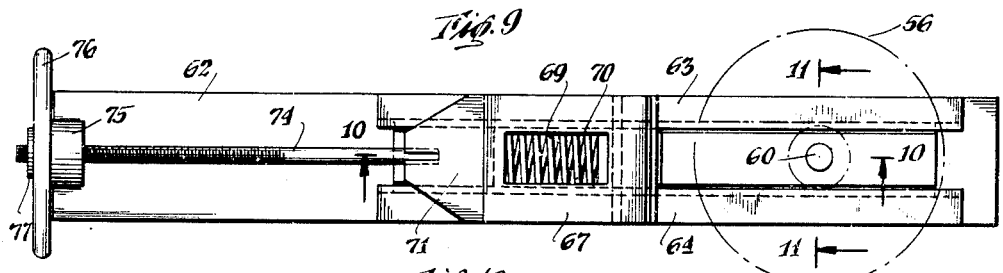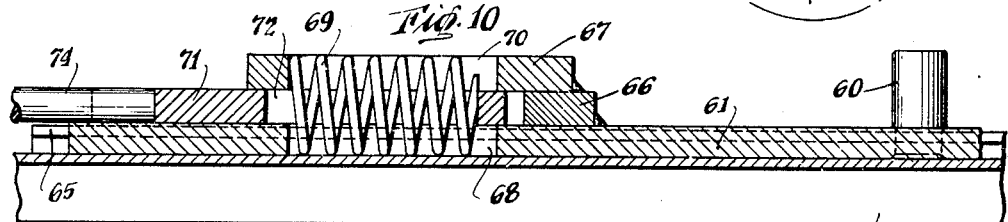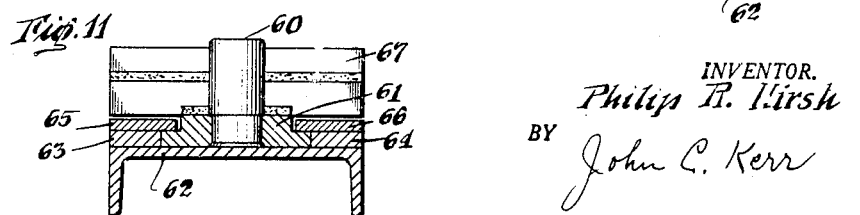

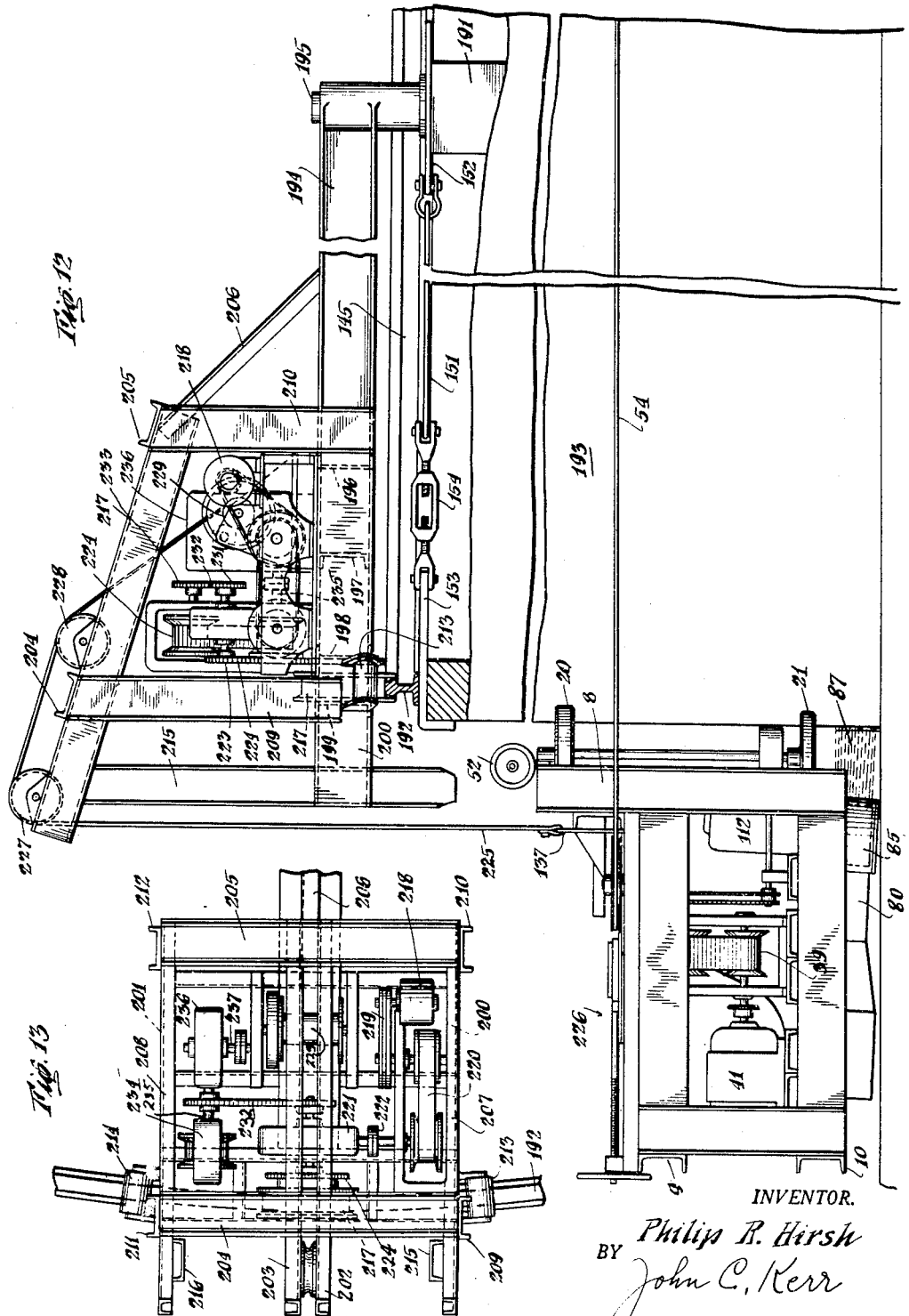

Patented July 19, 1949

2,476,299

UNITED STATES PATENT OFFICE 2,476,299

MACHINE FOR APPLYING COATING TO LARGE VERTICAL CYLINDRICAL OBJECTS

Philip R. Hirsh, Montclair, N. J., assignor to Lock Joint Pipe Company, East Orange, N. J., a corporation of New Jersey Application December 29, 1944, Serial No. 570,262

14 Claims. (Cl. 91—44)

This invention relates to coating machines and more particularly to machines for applying a coating of plastic material to a vertical or supstantially vertical surface of a tank, standpipe, large diameter pipe or other stationary structure.

Among the objects of the invention is to provide a coating machine which may be traversed about a vertically standing structure and which has provision for gradually raising a coating apparatus so as to apply a coating of mortar or of other plastic material upon the surface of the structure.

Another object of the invention is to provide mechanism for controlling the vertical travel and the circumferential travel of a coating machine about an upstanding structure and wherein means are provided for obtaining desired rates of vertical and circumferential travel with respect to each other for enabling the application of mortar to the structure with successive applications of the mortar lying adjacent each other.

Another object of the invention is to provide a coating machine for applying plastic material against a vertically standing stationary structure and means on the coating machine for enabling the coating machine to travel over the surface of the structure in a desired direction.

Another object of the invention is to provide a coating machine for applying plastic material to the wall of an upstanding structure, which includes a travelling carriage for supporting the coating machine from above the structure whose wall is to be coated.

Another object of the invention is to provide a coating machine which is suspended so as to contact with the exterior surface of a vertically standing structure with means thereon for driving the machine over the vertical surface and wherein traction of the suspended machine is attained by means cooperating with the machine and the structure being coated for maintaining the machine in rolling contact with the structure.

Another object of the invention is to provide a coating machine adapted to be suspended alongside a surface to be coated and held in contact therewith in combination with an over-head travelling support and wherein the overhead travelling support and the coating machine are provided with means adapted to cooperate together so as to permit the coating machine to be laterally supported by the over-head support when the coating machine approaches the upper portion or top of the structure being coated.

Another object of the invention is to provide coating apparatus including an over-head travelling support and a carriage upon which plastic material-projecting mechanism is carried and whereby the surface of the vertically standing object may be coated from its extreme lower end to its extreme upper end by the combined vertical and circumferential travel of the coating machine and the circumferential travel of its support about the structure.

Further and other objects of the invention will be hereinafter set forth in the accompanying specification and claims and demonstrated by the drawings which show by way of illustration a preferred embodiment and the principle of my invention and what I now consider the best mode in which I have contemplated applying that principle. Other embodiments of the invention employing the same principle may be used and structural changes made as desired by those skilled in the art within the spirit of the appended claims and without departing from the invention.

Referring to the drawings, Fig. 1 illustrates a side elevation of a machine embodying the principle of the invention;

Fig. 2 is a plan of the supporting carriage shown in Fig. 1;

Fig. 3 is a front elevation of the supporting carriage shown in Figs. 1 and 2;

Fig. 5 illustrates a front elevation of the coating machine shown in Fig. 4 and a portion of an over-head travelling carriage;

Fig. 6 is a plan of the coating machine;

Fig. 7 is a sectional view taken through the coating machine on line 7—7 of Fig. 6;

Fig. 8 is a detail of the mounting for the rotary brushes and their motors;

Fig. 9 is an enlarged view of the spring mechanism by which an endless cable encircling the structure to be coated is held in tension for the purpose of maintaining the coating machine in rolling contact with the structure;

Fig. 10 is a section through line 10—10 of Fig. 9;

Fig. 11 is a section through line 11—11 of Fig. 9;

Fig. 12 is a side elevation of a machine embodying the principle of the invention and wherein the over-head travelling carriage is provided with means for raising and lowering the coating machine;

Fig. 13 is a plan of the over-head travelling carriage illustrated in Fig. 12.

Figure 1:
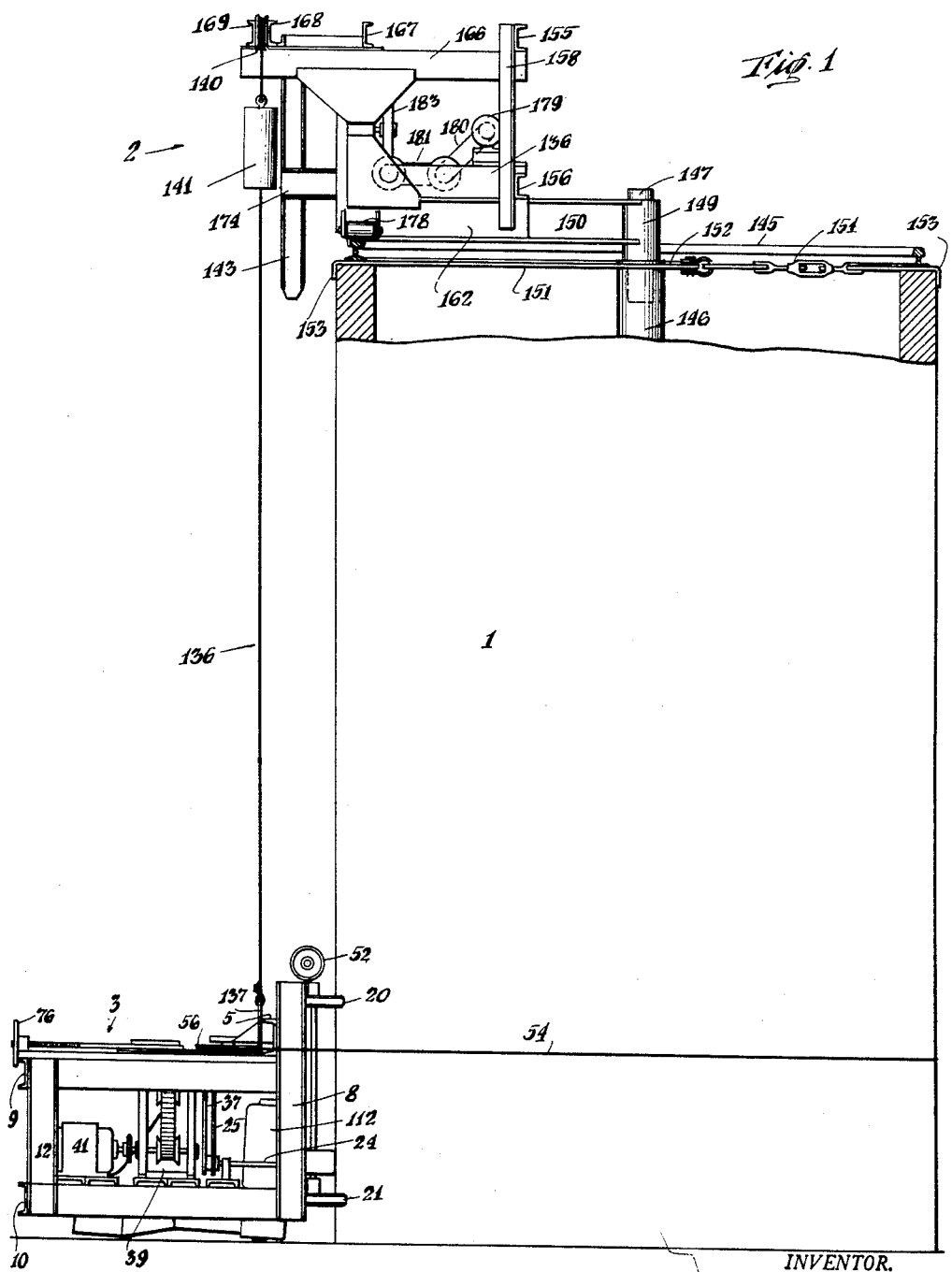
Figure 4:
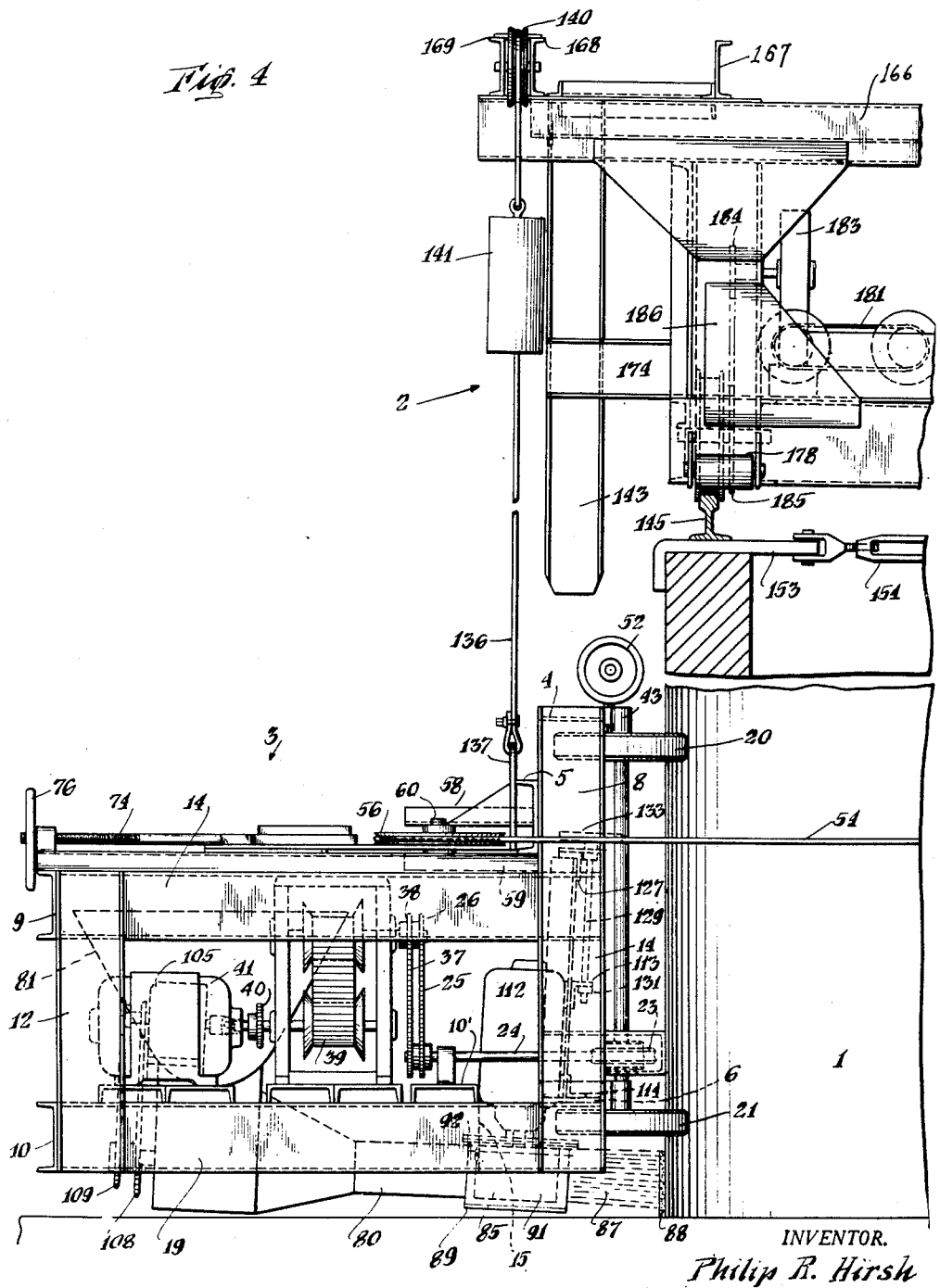
Fig. 4 is a side elevation of the machine shown in Fig. 1.

The machine of the present invention is designed for coating the exterior of a tank, standpipe or large diameter pipe which may be made of concrete or of other material. In Fig. 1 I have illustrated a machine for applying a coating of plastic material such as concrete to the exterior of a circular tank 1, but it is understood that the drawing may be considered as illustrating any other stationary structure which is to be coated. The machine includes a travelling carriage 2 which has suspended therefrom another carriage 3 which supports and is part of a machine for spraying concrete against the tank wall.

The coating machine 3 is arranged and powered for travel circumferentially about the tank and it is also provided with means for changing its course of travel so as to permit the carriage to rise and fall, depending upon the adjustment of its steering mechanism. The over-head travelling carriage 2 is provided with power means for causing its travel circumferentially about the tank during a coating operation.

One function of the over-head travelling carriage is to support the coating machine carriage as the latter rises under its own control during a coating operation. In order to obtain complete coverage of the surface of the tank with coating material, the rate of rise and the rate of circumferential travel of the coating machine is adjusted so as to cause the plastic material to be applied to the surface of the tank in helical strips which lie adjacent one another.

The coating machine is illustrated in Figs. 1, 4, 5, 6 and 7. The frame of the coating machine carriage is built from common structural elements. Two longitudinally extending vertical frames are connected together by channel members. The vertical frame facing the tank has three horizontal channel members 4, 5 and 6 extending between and connected to vertical end members 7 and 8. Channel member 6 is cut away at 6' to accommodate motors 111 and 112, Fig. 6. The other vertical frame has an upper member 9 connected to a lower member 10 by vertical members 11 and 12. These two longitudinally extending rectangular frames are spaced apart and connected together by a plurality of horizontal members including upper members 13 and 14, and lower members 16, 17, 18 and 19. One end of lower channel member 15 is secured to channel member 10 and the other end is supported by welded connections to beam 10'. Beam 10' overlies channel members 16, 17, 18 and 19 to which it is fastened.

The frame of the coating machine carries a pair of trucks for providing rolling contact with the surface of the tank. The rollers 20 and 21 of the rear truck are mounted upon a shaft 22 which is journalled in bearings mounted on channel members 4 and 6 of the carriage frame. This shaft carries a worm gear 23 which is driven through a worm carried by shaft 24. Shaft 24 carries a sprocket gear which is engaged by a sprocket chain 25 and is in turn driven from a sprocket wheel 26 on the output shaft of a variable speed transmission 39.

The front truck includes a pair of rollers 27, 28 which are fixed to shaft 29. The bearing 30 for the lower end of the shaft, Fig. 5, is mounted upon a plate 31 which rests against the vertical flange of an angle iron 32 extending longitudinally of the carriage and is adapted to slide thereover with shaft 33 as a center. Plate 31 is fixed to a gear box 34 which is pivotally supported on a bracket 34' with shaft 33 as a center.

Gear box 34 encloses a worm gear 35 which is fixed to roller shaft 29 and which engages a worm on shaft 33 whereby power is transmitted to shaft 29 for driving the forward truck. Shaft 33 carries a sprocket wheel 36 which is engaged by a sprocket chain 37 having connection with a sprocket wheel 38.

Sprocket wheels 26 and 38 are secured to the output shaft of a variable speed transmission 39, the input shaft of which is driven through a sprocket chain 40 from a motor 41. A positive drive is thereby delivered to both sets of truck wheels and the speed of the coating carriage over the surface of the structure may be adjusted as desired by setting the variable speed transmission 39.

The direction of travel of the coating machine carriage can be controlled either upwardly or downwardly of the vertical surface over which the carriage travels by means under the control of an operator. This is accomplished by mounting the bearings of shaft 29 of the steering truck for permitting change in angularity of the shaft in a vertical plane about shaft 33 as a center. The lower end of shaft 29 is mounted in bearing 30 carried by plate 31 which can be pivoted about shaft 33. The upper end of shaft 29 is mounted in bearing 43 which is carried by a plate 44 slidably resting upon a plate or bracket 45 which is fixed to channel member 4. Slidable plate 44 has an arcuate edge 46 whose center is at the center of shaft 33. A pair of clips 47, 48, mounted on bracket 45 extend over the arcuate edge 46 of plate 44 and in sliding contact with the plate.

Plate 44 has fixed to it a gear-rack 49 which is engaged by a worm 50. Worm 50 is mounted upon a shaft 51 which has at its end a handwheel 52. Shaft 51 is mounted for rotation in bearings carried by bracket 45 and by rotating the handwheel 52 the gear-rack 49 and its associated slide plate 44 and shaft bearing 43 may be moved to the left or to the right, Fig. 5. For causing the coating machine carriage to travel upwardly and around the tank, the bearing 43 would be moved to the right from its position shown in Fig. 5 sufficiently to change the angularity of shaft 29 to set the truck wheels 27 and 28 in the desired direction.

The coating carriage carries its own propelling mechanism from which power is transmitted to both pairs of trucks, as explained hereinabove. Inasmuch as the machine is used for coating an upstanding wall, and the axes of the truck wheels are substantially vertically disposed during a coating operation, it is necessary to provide means for laterally supporting and holding the carriage in contact with the wall of the structure to be coated. This is accomplished by means of an endless band or cable 54 which encircles the structure and is engaged by sheaves mounted on the coating carriage. One of these sheaves is illustrated at 55, Fig. 6. The other sheave 56 is so mounted as to transmit tension to cable 54 and thereby cause the carriage to be pressed against the tank wall. Sheave 55 is mounted on a shaft 57 which is carried by bearings supported by a pair of channel members 58, 59, fastened directly and by brackets to channel member 5. While for some uses only one sheave would be necessary, in the present coating carriage two are employed.

The sheave 56 is mounted on an adjustable support, including a stud shaft 60 which is positionable towards and away from the structure against which the trucks of the carriage bear. Adjustability of this sheave is provided for the purpose of adjusting the tension in the encircling cable 54 so as to cause greater or lesser pressure of the truck wheels against the surface of the structure.

Stud shaft 60 is carried by a slide 61, Figs. 9, 10 and 11, which rests upon a fixed channel member 62 extending between channel members 5 and 9 of the carriage. Slide 61 is guided for sliding in a longitudinal direction along channel 62 by strips 63, 64, one at each side of the slide. Strips 65 and 66 overlying strips 63 and 64, respectively, provide shoulders over the slide and hold the slide within the groove formed by strips 63 and 64. Attached to slide 61 and extending crosswise of it is a bar 66 which in turn has attached to it an apertured plate 67.

Slide 61 has a rectangular opening 68 sufficiently large to accommodate coiled spring 69. The opening 70 in plate 67 is of the same size and shape as that of the opening 68 in the slide 61 and directly over said opening so that the spring may be accommodated equally in the two openings. It will be apparent from the foregoing that by compressing the spring against the left edges of openings 68 and 70, Fig. 10, slide 61 will be resiliently urged to the left. This has the effect of increasing the tension in the encircling cable 54, as may be readily appreciated from Figs. 4 and 6.

Compression of the spring 69 is accomplished by means of an apertured plate 71 which is disposed between slide 61 and connected plate 67. The opening 72 in plate 71 is of the same shape and dimensions as those of the openings 68 and 70 in slide 61 and plate 67, respectively. The spring may be inserted in position by sliding plate 71 so as to bring its opening 72 into registry with the openings 68 and 70. When it is desired to increased the tension in the encircling cable 54, plate 71 is moved to the left, with the result that the right edge of the opening 72 bears upon the end of the coiled spring 69 and compresses the spring between the right edge of opening 72 and the left edges of openings 68 and 70, as shown in Fig. 10.

Slide plate 71 has secured to it a threaded rod 74 which extends through a smooth bore in a lug 75 which is carried by channel member 62. Rod 74 can be actuated against the tension in coil spring 69 through the rotation of a handwheel 76 which is mounted upon a threaded boss 77. This threaded boss is held in contact with the lug 75 by reason of the tension in the spring. It is apparent from the foregoing that tension in the encircling band 54 may be increased or decreased at will by the manual operation of handwheel 76 whose setting determines the amount of force exertable by spring 69 on slide 61 which carries sheave 56.

The apparatus for applying the coating material to the wall of the structure to be coated includes a conveying conduit 80 having its material-receiving end attached to a feed hopper 81, Figs. 6 and 7. The feed hopper has an opening 82 through which material discharges to the conveying conduit. Conveying conduit 80 discharges directly against two rotary brushes 84, 85 located below the lower wheels of the carriage, Figs. 5 and 7.

The discharge end of the conduit is connected to a housing which encloses portions of the brushes. Material advanced through the conduit is projected in a stream from between the two rotary brushes as they rotate in opposite directions. The stream 87 is forcibly projected by the brushes against the surface of the structure and forms a coating as shown at 88, Fig. 7, as the carriage advances.

The housing at the discharge end of conduit 80 encloses upper and lower portions of the sides of the brushes and also portions of the peripheries of the brushes, Figs. 4, 5, 6 and 7. This housing is in open communication with the end of conduit 80 and consists of a lower plate 89 welded to cylindrical walls 90 and 91 extending from opposite sides of conduit 80 and partially encircling brushes 84 and 85, respectively, and an upper plate 92 which is removably attached to the cylindrical walls 90 and 91.

The lower part of the housing is supported from the carriage frame. For this purpose a pair of fin plates 93 and 94 are welded to the cylindrical walls of the housing and to channels 95 and 96, respectively, of the carriage frame, Fig. 6. Upper plate 92 is detachably connected by a number of bolts 97 to flanges of angle irons carried by the lower part of the housing. Upper plate 92 is attached to motors 111 and 112 by means of screws 98, 99 and spacers between the motors and the plate, Fig. 5. When bolts 97 are removed, upper plate 92 may be displaced from the lower part of the housing by the movement of the motors away therefrom. The brushes are carried by the motor shafts and the removal of the brushes from within the housing provides for access to the housing and the conduit for cleaning purposes.

For advancing the material through the conduit a worm 100 is provided, Fig. 7. While one worm may be employed, the construction illustrated includes a second worm 101 located in the conduit near its discharge end. Worm 101 is mounted on the end of shaft 102 which is supported in bearings contained in hollow shaft 103 of worm 100. The function of worm 101 is to assure the maintaining of a substantially constant pressure of material against the surfaces of the rotating brushes. The worm 101 and shaft 102 is rotated at a higher speed than the speed of worm 100 and its shaft 103.

The worms 100 and 101 are concomitantly driven from motor 41, Figs. 5 and 6, through chain and sprocket connection 46, shaft 104, speed reducing mechanism 105 and sprocket chains 106 and 107, respectively. Sprocket chain 106 engages and drives sprocket wheel 108 on hollow shaft 103 and sprocket chain 107 engages and drives sprocket wheel 109 on shaft 102. The axis of the conveying conduit 80 and the direction of movement of the delivered stream of material 87 is inclined slightly to the horizontal, as illustrated in Fig. 7. This arrangement enables the extreme lower portion of the tank to be coated.

In order to remove the brushes from the end of the conveying conduit for cleaning purposes, the motors for the brushes are so mounted as to be slidable with respect to the main frame of the coating carriage. The motors 111 and 112 for the rotary brushes 84 and 85, respectively, are mounted on a pair of angle irons 113, 114 and thus form with the angle irons a slidable frame or carriage. The ends of the angle irons are fastened to and rest against angle irons 115, 116 which serve as rails. Each motor is secured in position on angle irons 113 and 114 by two sets of adjusting screws 117, 118, Fig. 8. These screws provide means for adjusting the spaced relationship between the peripheries of the rotary brushes as well as serve to secure the motors to each of angle irons 113 and 114. Adjustability of the motors is desired to accommodate the spacing of the brushes for projecting plastic material of different densities and for wear of the brushes. A mortar having coarse aggregate requires a greater spacing than a smooth cement mortar.

The positions of angle irons 113 and 114 may be maintained fixed by means of clamps 119, 120, 121 and 122 which releasably engage the angle irons 115 and 116 when the brushes are in position opposite the end of the conveying conduit 80.

Angle irons 115 and 116 are respectively secured to channel members 125, 126 which are fixed to main frame members of the coating machine carriage. Extending between and connected to channel members 125 and 126 is an angle iron 127 which supports an apertured bracket 128. A threaded shaft 129 extends downwardly from a hub 130 above bracket 128. The lower end of the shaft engages with a nut 131 fastened to the under side of the flange 132 of angle iron 113 of the motor frame. The weight of the motors and their supporting frame members 113 and 114 is carried by shaft 129 when the clamps 119, 120, 121 and 122 are released. When these clamps are released and bolts 97 are removed from engagement with top housing plate 90 the motors may be raised by operation of shaft 129 through handwheel 133. The motors may be drawn upwardly to such a height as to facilitate the cleaning of the brushes and the interior of the conduit.

The rate of travel of the coating machine carriage 3 circumferentially about the tank may be controlled by adjusting the setting of the variable speed transmission 39 and the rate of rise of the carriage may be controlled by adjusting the steering of the front pair of wheels 27, 28. As explained in the foregoing description of the coating machine carriage, the angularity of the shaft of the front pair of wheels determines the rise of the coating machine carriage per revolution of the carriage about the tank. The carriage is supported from overhead by a cable 136 suspended from an overhead travelling carriage 2. The lower end of this cable is fastened to a plate 137 which is secured to channel member 5 extending lengthwise of the coating machine carriage, Figs. 4 and 5. Cable 136 is trained over sheave 139 and sheave 140 on the overhead supporting carriage 2, Figs. 1, 2, 3 and 5, and has fastened to its other end a counterweight 141 whose weight is so proportioned as to offset the weight of the coating machine carriage. As the carriage rises during its travel about the tank, the counterweight descends. The overhead supporting carriage 2 is driven around the tank at the speed of circumferential travel of the coating machine carriage 3.

In view of the fact that the material-projecting apparatus is so mounted upon the coating machine carriage as to start a coating operation at the extreme bottom of a tank, as shown in Fig. 1, it is apparent that a portion of the tank at its top cannot be coated unless provision is made for enabling the brushes to rise to the extreme upper edge of the tank. In order to complete the coating operation to the extreme upper edge of the tank, means are provided for supporting the coating machine carriage during its last few passes around the tank.

For supporting the coating machine carriage during the final coating operation, the overhead supporting carriage 2 is provided with a pair of channel members 142, 143 which are vertically disposed and so spaced as to engage channel members 7 and 8, respectively, on the coating machine carriage. The webs of channel members 142 and 143 are of less depth than the webs of channel members 7 and 8 so as to telescope within the latter channel members and serve as guide rails for the latter channel members. Channel members 142, 143 extend sufficiently below the upper edge of the tank to enable their engagement by channel members 7 and 8, respectively, before the upper wheels 20, 27 run off the surface of the tank.

When the coating machine carriage has risen sufficiently to enable channel members 142 and 143 to be engaged by channel members 7 and 8, the travelling of the overhead carriage about the tank is continued as the corresponding engaging channel members are successively engaged. Upon their engagement the continued travel of the whole machine about the tank will cause the coating machine carriage to rise with the vertical guide channels in sliding engagement and laterally supporting the top part of the coating machine carriage as the upper wheels 20 and 27 leave the surface of the tank. The coating machine will continue to rise as the coating operation continues, with the result that the tank may be coated to a height greater than would otherwise be possible.

The overhead travelling carriage 2 is mounted to run over a circular track 145 which is supported by the upper edge of the tank, Figs. 1, 3, 4 and 5. A post 146 is erected centrally of the tank and the post has extending from its upper end a bearing pin 147 which is engaged by a sleeve 149 at the end of beam 150 of the carriage. The post 146 is located centrally of the tank 1 by a number of radially-extending stays 151. These stays are fastened to a ring 152 which engages bearing pin 147 and hooks 153 at their outer ends. The hooks engage the wall of the tank. Turnbuckles 154 enable accurate centering of the post.

The framework of the supporting carriage 2 includes upper and lower channel members 155, 156, at its rear which are connected to vertical columns 157 and 158, Figs. 1, 2 and 3. Other columns 159, 160 extend vertically from lower side channel members 161 and 162, respectively, which latter are connected at their rear ends to columns 157 and 158, respectively, and to lower rear channel members 156. The middle of cross-member 156 rests upon and is secured to beam 150.

The forward ends of lower side members 161 and 162 are connected to cross channel members 163 and 164. The middle of channel 164 is attached to the end of beam 150.

Upper side members 165 and 166 extend between and are connected to columns 157 and 159 and columns 158 and 160, respectively, and are attached to upper channel member 155 running crosswise of the rear of the carriage. Upper side members 165 and 166 support and are connected to channel members 167, 168 and 169, running crosswise of the carriage.

Upper crosswise extending channel members 155, 167 and 168 extend beyond the left end of the main portion of the frame, Figs. 2 and 3, and are connected together at their left ends by channel member 171. Lower crosswise extending channel members 156 and 163 likewise extend to the left beyond the main portion of the frame and are connected at their ends by channel member 172.

Upper and lower channel members 171 and 172 are connected together at their front ends by vertically-extending channel member 142 which serves as a guiding rail and support for the left-hand wheels of the coating machine 3 under certain operating conditions, as explained hereinabove. A similar vertically-extending channel member 143 serves as a guide and support for the right-hand wheels of the same machine under the same operating conditions. This channel member 143 is supported at its upper end from channel member 173 and lower down of its length by channel member 174 extending from the front to the back of the carriage. Channel members 172 and 174 overlie and are secured to crosswise extending member 163 and are secured to cross-wise extending member 156 at the rear of the carriage. Channel members 171 and 173 are attached to member 168 at the front of the carriage, member 167 and to member 155 at the rear of the carriage. Additional structural elements, braces and brackets are provided for maintaining the frame structure of the carriage.

Near the ends of upper cross-wise member 169 and between member 169 and member 168 there are two loosely mounted pulleys 139 and 140 over which cable 136 is trained. The cable supports the coating machine carriage 3 at one end and a counterweight 141 at its other end.

The over-head travelling carriage 2 is mainly supported by a roller 176 which bears upon track 145. This track is placed over the structure to be coated and is usually mounted upon the same as illustrated in Figs. 1, 3, 4 and 5. Roller 176 is supported from the carriage by bearings mounted on lower cross-wise members 163 and 164 of the frame. Substantially the entire weight of the carriage and its load are transmitted through this roller to rail 145. So as to prevent tipping of the carriage, a pair of smaller rollers 177 and 178 are provided; roller 177 is mounted on a bracket which is attached to lower side member 161, and roller 178 is mounted on a bracket which is attached to lower side member 162. These rollers are immediately over rail 145.

The power for driving the over-head travelling carriage includes a motor 179 having a chain or belt connection 180 with a variable speed transmission 181. This latter is connected by a coupling 182 to a speed reducer 183. A sprocket wheel 184 on the output shaft of the speed reducer drives sprocket wheel 185 through a sprocket chain 186. Sprocket wheel 185 is keyed to the shaft upon which roller 176 is fixed. It will be appreciated that by use of the variable speed transmissions on the over-head travelling carriage 2 and on the coating machine carriage 3 it is an easy matter to control the circumferential speed of these two carriages so that they will travel together. A platform 187 is provided on the over-head travelling carriage 2 for the convenience of an operator.

An optional form of support for the coating machine carriage is illustrated in Figs. 12 and 13. The pivoted end of the support is mounted upon a center post 191 and the front end of the support is supported by a rail 192 of a circular track which is mounted over the wall of the tank 193. The support includes an H-beam 194 extending from a bearing surrounding a pin 195 to the tank wall. A plurality of horizontal floor beams 196, 197 and 198 are fastened to and extend laterally from each side of the H-beam 194. These floor beams and beam 199 at the front of the support are connected at their outermost ends by channel irons 200 and 201, one at each side of the frame.

A crane arm, which extends beyond the exterior of the wall of the tank is composed of two structural members 202, 203, supported by channel members 204 and 205 and a brace 206 extending rearwardly and attached to beam 194. Channel members 204 and 205 are supported on one side of the frame by channel member 207 and on the other side of the frame by channel member 208. The front and rear ends of channel member 207 are supported, respectively, by columns 209 and 210 which are attached at their lower ends to channel member 200. The front and rear ends of channel member 208 are supported, respectively, by columns 211 and 212 which are attached at their lower ends to channel member 201. Rollers 213 and 214 are mounted on brackets which extend from opposite sides of the frame, and serve to prevent the frame from tipping. The whole support constitutes a travelling crane or carriage.

The forward ends of lower side member 200 and of upper side member 207 support a vertically disposed channel 215 to which they are attached. The forward ends of lower side member 201 and of upper side member 208 support a vertically disposed channel 216 to which they are attached. These two channel members 215 and 216 are for the purpose of engaging channel members 7 and 8 on the coating machine carriage, for the function hereinbefore described in the description of the operation of the coating machine carriage when the extreme upper end of the tank is being coated.

The greater part of the frame and its load is supported by a roller 217 which bears upon rail 192. Roller 217 is journalled between beams 198 and 199. The frame is driven in a circular path about bearing pin 195, as a center, by power transmitted to roller 217. Motor 218 provides the motive force. This motor has a belt connection 219 with a variable speed transmission 220 which in turn drives a speed reducer 221 through a coupling 222. The output shaft of the speed reducer 221 carries a sprocket wheel 223 by which chain 224 is driven. This chain is connected with a sprocket wheel secured to the shaft on which the roller 217 is keyed. By suitable adjustment of the variable speed transmission 220, the rate of travel of the support along rail 192 may be varied.

The coating machine carriage is suspended from the support by a chain or cable 225 whose lower end is connected to the carriage 226. This cable extends upwardly, over sheave 227 and sheave 228 to a winch 229 to which it is connected. The winch takes the load of the carriage and also controls its elevation. By controlling the rate of revolution of the winch the rise during each successive turn of carriage 226 about the tank may be determined.

The relationship between the rate of rising of the carriage and the rate of circumferential movement of the carriage about the tank affects the pitch of the strips of plastic material being applied about the tank. In order to synchronize these two movements, and to make their relationship adjustable by an operator, it is convenient to drive the support and the winch from a common source of motive power. Accordingly, the drive for the winch is taken from the output shaft of speed reducer 221. Sprocket wheel 231 on the output shaft drives a chain 232 which in turn drives a sprocket wheel 233 of variable speed transmission 234. Shaft 235, connected with the output side of the variable speed transmission 234, drives speed reducer 236 which in turn drives winch 229 through shaft 237. It is thus apparent that the rate of rising of the coating machine carriage may be changed with respect to the circumferential horizontal movement of the crane carriage by changing the adjustment of the variable speed transmission 234.

The rate of travel of the coating machine carriage is under the control of its motor 41, Figs. 4, 5, 6 and 12 and, as the over-head support should have the same rate of travel around the tank, suitable adjustment of the variable speed transmission 220 on the over-head support may be made to bring about this result. This adjustment may be made manually, or by servo-motors adjusted to synchronize the speed of travel of the coating machine carriage and its over-head support. After this adjustment has been made, the spacing of the turns of carriage 226 will be determined in accordance with the setting of the variable speed transmission 234 through which the drive comes for elevating the carriage.

I have described hereinbefore means mounted on the coating machine carriage for effecting a change in direction of travel of that carriage in travelling circumferentially around the tank. This means includes hand control of the steering of shaft 29 upon which the front set of rollers 27, 28 is mounted, Figs. 5 and 6. It will be appreciated that when the rate of operation of the winch on the over-head support controls the rate of rising of the carriage it will not be necessary to steer the coating machine carriage by altering the inclination of the front set of rollers 27, 28, and that in such case the rollers may be permitted to assume their natural inclination.

This application is related to my copending application, Serial No. 556,583, filed September 30, 1944, and in which over-head travelling carriages like those described herein are disclosed.

What is claimed is:

1. A machine for applying a coating of plastic material upon the surface of a tank or like stationary structure having a substantially vertical wall, comprising a carriage, plastic material-projecting mechanism mounted on said carriage, means supporting said carriage in rolling contact with said wall of said structure, means for holding said carriage in rolling contact with said wall of said structure during a coating operation, means for driving said carriage during a coating operation, a support mounted above said structure and having suspension means connected with said carriage, said suspension means including a cable having one end fastened to said carriage and its other end fastened to a freely hanging counterweight, the cable being supported on sheaves journalled on said support whereby said carriage is free to rise under its own control during a coating operation, steering means carried by said carriage for controlling the rise or fall of the carriage and counterweight during the travel of the carriage about said structure, and means for driving said support.

2. A machine for applying a coating of plastic material upon the surface of a tank or like stationary structure having a substantially vertical wall, comprising a carriage, means on said carriage for applying plastic material onto the surface of said wall, means for supporting said carriage in rolling contact with said wall of said structure, means supporting said carriage opposite said structure, said means including a support mounted for travel above said structure and a suspension element extending to said carriage, means carried by said support for laterally supporting said carriage beyond the upper limit of said wall during coating of the upper part of said structure, means on said carriage for engaging said last-named means, and means for driving said support for travel about said structure.

3. A machine for applying a coating of plastic material upon the surface of a tank or like stationary structure having a substantially vertical wall, comprising a carriage, means on said carriage for applying plastic material onto the surface of said wall, means for supporting said carriage in rolling contact with said wall of said structure, a second carriage for supporting said first-named carriage opposite said wall, telescopingly engaging means carried by said carriages for laterally supporting said first-named carriage by said second-named carriage when said first-named carriage travels above said vertical wall, and means for driving said second-named carriage.

4. A machine for applying a coating of plastic material upon the surface of a tank or like stationary structure having a substantially vertical wall, comprising a carriage adapted for relative movement with respect to said wall, means supporting said carriage opposite said wall, rollers carried by said carriage for supporting said carriage in rolling contact with said wall, an idler sheave mounted on said carriage, a band encircling said structure and engaging said sheave, means for resiliently supporting said sheave to cause the same to exert tension in said band and hold said carriage against said wall, means carried by said carriage for applying plastic material to said surface, and means for driving at least one of said rollers for advancing said carriage over said wall during a coating operation.

5. A machine for applying a coating of plastic material upon the surface of a tank or like stationary structure having a substantially vertical wall, comprising a carriage adapted for relative movement with respect to said wall, an idler sheave mounted on said carriage, a band encircling said structure and engaging said sheave, means for resiliently supporting said sheave to cause the same to exert tension in said band and hold said carriage against said wall, said last-named means including a spring having one end bearing against a fixed abutment on said carriage and its other end engaged by a manually adjustable member whereby the tension in said spring and the tension in said band may be varied, rollers carried by said carriage for supporting said carriage in rolling contact with the wall of said structure, means for driving at least one of said rollers for advancing said carriage over said wall, means carried by said carriage for applying plastic material to said wall, and means for supporting said carriage during its advance over the surface of said wall.

6. In a machine for coating the wall of a structure, the combination comprising a carriage, rollers mounted on said carriage for engaging a structure to be coated, means carried by said carriage for applying plastic material onto the wall of said structure, an endless band encircling the wall of a structure to be coated, means including an idler sheave carried by said carriage and engaging said band whereby said band is held taut for holding said rollers in contact with the wall of the structure to be coated, and means carried by said carriage for advancing said carriage over the wall of said structure during a coating operation.

7. In a machine for coating the surface of a structure, the combination comprising a carriage, rollers mounted on said carriage for engaging the surface of a structure to be coated, means carried by said carriage for applying plastic material onto the structure to be coated, an endless band encircling the structure to be coated, an idler sheave carried by said carriage and engaging said encircling band for holding said band taut and said rollers in contact with the surface to be coated, adjustable means resiliently supporting said sheave to vary the tension in said cable, and means carried by said carriage for advancing said carriage over the surface of said structure during a coating operation.

8. In a machine for coating the surface of a structure, the combination comprising a carriage, sets of rollers mounted on said carriage for supporting said carriage against the surface of a structure, means carried by said carriage for advancing said carriage over the surface of said structure, means cooperating with said carriage and said structure for maintaining said sets of rollers in contact with the surface of said structure, said means including an endless band encircling said structure and engaging an idler sheave on said carriage, and means carried by said carriage for applying plastic material to the surface of said structure.

9. In a machine for coating the surface of a structure, the combination comprising a carriage, sets of rollers mounted on said carriage for bearing against the surface of a structure to be coated, at least one of said sets of rollers being mounted for pivot on an axis perpendicular to its own axis, a driving shaft for said last-named set of rollers, said driving shaft being mounted on said carriage with its axis on the axis of pivot of said last-named set of rollers, means for actuating said driving shaft, and means carried by said carriage for applying a coating of plastic material to the surface of said structure as said carriage is driven over the surface of said structure.

10. In a machine for coating the surface of a structure comprising a carriage and rollers mounted on said carriage for bearing against the surface of a structure to be coated, the combination comprising a frame, a pair of guide members supporting said frame on said carriage, a pair of motors mounted on said frame, a pair of rotary brushes driven by said motors, a conduit for delivering plastic material to said brushes, said conduit being mounted on said carriage, means releasably holding said frame on said guide members with said brushes at the discharge end of said conduit, and means for sliding said frame over said guide members.

11. In a machine for coating the surface of a vertical structure, said machine including a carriage and rollers mounted from one side of said carriage with their axes vertically disposed for bearing against the surface of the vertical structure, the combination comprising a frame on said carriage, a pair of motors mounted on said frame, means for adjusting the spaced relationship of said motors, means slidably supporting said frame for enabling displacement of said frame and motors in a direction substantially parallel to the axis of said rollers, a pair of rotary brushes supported and driven by said motors, a conduit for delivering plastic material to said brushes, said conduit being mounted on said carriage and disposed thereon to discharge material to said brushes in a direction substantially perpendicular to the axes of said rollers, and means engaging said carriage and said frame whereby said motors and brushes may be lifted vertically for removing said brushes from cooperation with said conduit.

12. In a machine for coating the surface of a vertical structure, said machine including a carriage and rollers mounted from one side of said carriage for bearing against the vertical surface of a structure, the combination of a pair of guide members disposed substantially parallel to the axes of said rollers, a pair of motors, a pair of elements supporting said motors, said elements being supported at their ends by said guide members, adjustable means for securing said motors to said elements whereby the spacing of said motors may be changed, means supporting said elements and said motors, said means including a bar fixed in respect to said guide members and a manually operable means cooperating with said bar and with at least one of said elements whereby said elements and motors may be displaced vertically with respect to said bar, a pair of brushes driven and carried by said motors, and means for adjusting the spacing of said brushes, said means comprising screws engaging said elements and said motors.

13. In a machine for coating the surface of a vertical structure, the combination comprising a carriage, two pairs of rollers mounted on said carriage for bearing against the surface of a vertical structure, a pair of pivotally mounted bearings supporting one of said pairs of rollers for pivotal movement of said rollers in a direction perpendicular to the axis of said rollers, a driving element located with its center at the center of pivotal movement of one of said bearings, means for actuating said driving element, and manual means for adjusting the pivotal position of the other of said bearings to change the angularity of the axis of said rollers.

14. A machine for applying a coating of plastic material upon the surface of a tank or like stationary structure having a substantially vertical wall, comprising a carriage, rollers for supporting said carriage in contact with said structure, means for urging said rollers into pressure engagement with said vertical wall, means on said carriage for driving at least one of said rollers for propelling said carriage over said wall, means for applying plastic material onto the surface of said wall, said applying means being located in a fixed position near the lower portion of said carriage, means supporting said carriage opposite said structure, said means including a support adapted to travel over the horizontal upper surface of said structure and a cable extending from said support to said carriage, actuating means for driving said support about said structure, and means on said support for engaging said carriage whereby said support and carriage can be joined for unitary movement when said carriage approaches the upper limit of said structure so as to laterally support said carriage and enable the coating of the upper vertical wall portion of said structure with the rollers of said carriage removed from engagement therewith.

PHILIP R. HIRSH.

REFERENCES CITED

The following references are of record in the file of this patent:

UNITED STATES PATENTS

| Number | Name | Date |
|---|---|---|
| 942,403 | McCoy | Dec. 7, 1909 |
| 1,022,956 | Lengerke | Apr. 9, 1912 |
| 1,623,539 | Horten | Apr. 5, 1927 |
| 2,352,749 | Wills | July 4, 1944 |
| 2,370,780 | Crom | Mar. 6, 1945 |